United States Patent

Carlson

[15] 3,667,248
[45] June 6, 1972

[54] PROBE TYPE DIE COOLING ARRANGEMENT

[72] Inventor: Arthur H. Carlson, Route 1, P.O. Box 369, Sawyer, Mich. 49125

[22] Filed: Sept. 8, 1970

[21] Appl. No.: 70,093

[52] U.S. Cl. ................................62/225, 18/DIG. 9, 62/293, 164/128, 164/348, 249/79
[51] Int. Cl. ....................................B22d 27/04, F25b 41/04
[58] Field of Search..........................62/62, 64, 66, 293, 225; 164/122, 126, 348; 165/47; 249/79; 18/DIG. 9

[56] References Cited

UNITED STATES PATENTS

| 925,803 | 6/1909 | Custer | 164/126 |
| 1,391,675 | 9/1921 | Emery | 164/126 |
| 2,637,882 | 5/1953 | Plott | 249/79 |
| 2,672,032 | 3/1954 | Towse | 62/293 |
| 3,127,753 | 4/1964 | Tinnerman | 18/DIG. 9 |

Primary Examiner—William F. O'Dea
Assistant Examiner—P. D. Ferguson
Attorney—Mann, Brown, McWilliams & Bradway

[57] ABSTRACT

A cooling arrangement for cooling, with liquid carbon dioxide or the like, a die formed with a coolant receiving passage in which a probe structure is mounted in the passage in sealed relation thereto adjacent the outer end of the passage, with the probe comprising an elongate tubular member formed at one end to receive the coolant fluid and at the other end to discharge the fluid into the die passage, and an annular heated coolant receiving chamber formed about the tubular member adjacent its outer end and formed with a heated coolant discharge port adjacent the outer end of the passage and a heated coolant receiving port adjacent the other end thereof and short of the inner end of the tubular member. The coolant receiving end of the tubular member and the coolant discharge end of the chamber are connected into a closed circuit refrigeration system for supplying liquified gas to the probe and reliquifying the heated gas after it leaves the probe for resupply to the probe.

3 Claims, 4 Drawing Figures

INVENTOR
ARTHUR H. CARLSON

BY
Mann, Brown, McWilliams & Bradway
ATTORNEYS

INVENTOR
ARTHUR H. CARLSON

BY
Mann, Brown, McWilliams & Bradway
ATTORNEYS

PROBE TYPE DIE COOLING ARRANGEMENT

This invention relates to the cooling of dies used for injection molding of metals and the like, and more particularly to a cooling arrangement that employs a closed circuit refrigeration system for maximum heat removal per unit volume of coolant employed.

Die arrangements for injection molding and the like conventionally are formed with coolant receiving passages through which a suitable coolant liquid, such as water, is circulated to remove excess heat. While water has a relatively high heat absorbing capacity and is inexpensive to supply in bulk, in situations such as in the injection molding of metals, where a high amount of heat transfer of the coolant must be effected in a short period of time, a more effective heat removing medium is required.

A principal object of this invention is to provide a liquified gas cooling arrangement for cooling dies and the like in which a special probe, that is connected to a closed circuit refrigeration system for reliquifying the gas, is introduced into the die coolant receiving passage to provide a low thermal content cooling medium for rapid absorption and removal of large amounts of heat.

Other objects of the invention are to provide a special probe device for inserting and removing a liquified gas from the die cooling passage in a controlled manner, to provide a new method of cooling dies utilizing liquified gas such as carbon dioxide, and to provide a cooling arrangement for cooling dies that is economical of manufacture, convenient to install and use, and long lived in operation.

In accordance with this invention, a probe structure that is part of a closed circuit refrigeration system for providing carbon dioxide or its equivalent in liquid form is mounted in sealed relation within the die coolant passage. The probe structure includes a central tubular member that receives liquified gas coolant at its outer end and discharges same into the passage at its inner end, and a circumambient chamber about same adjacent its outer end which receives the expanded and removed heat containing gas and introduces same into the refrigeration system for heat removal, reliquification, and return to the probe. The coolant is preferably introduced into the probe in timed intermittent periods to allow for full heat absorption and return into the probe of a particular charge of coolant before another charge is introduced into the die passage.

Yet other objects, uses, and advantages will be obvious or become apparent from a consideration of the following detailed description and the application drawings.

However, it is to be understood that the specific drawing illustrations provided are supplied primarily to comply with the requirements of the patent code, and that the invention may have other embodiments that are intended to be covered by the appended claims.

Figure 1:
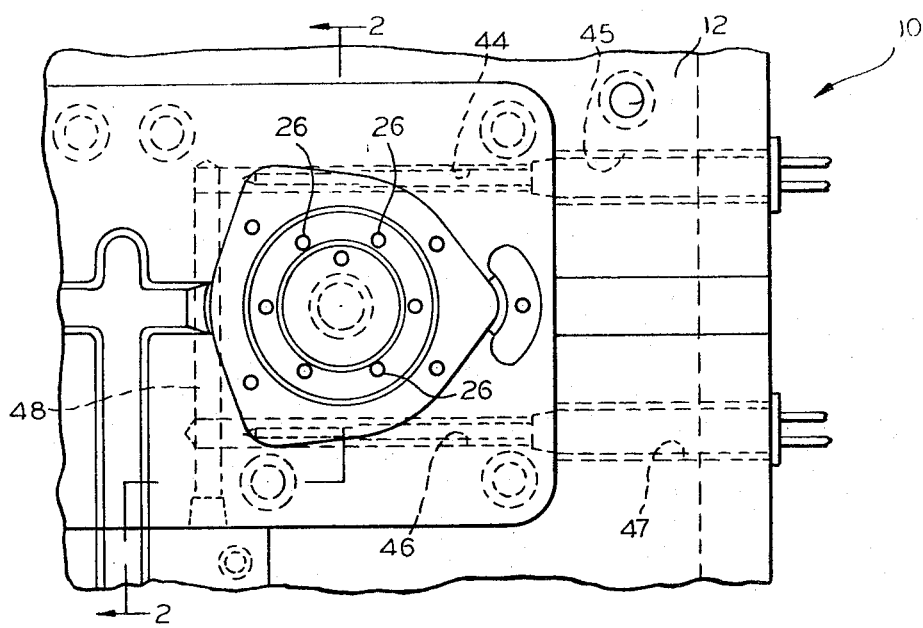
FIG. 1 is an elevational view diagrammatically illustrating a more or less conventional die arrangement for injection molding of aluminum or the like, showing in dashed lines several cooling passages therefore with probes of the type contemplated by this invention mounted therein.
Figure 2:
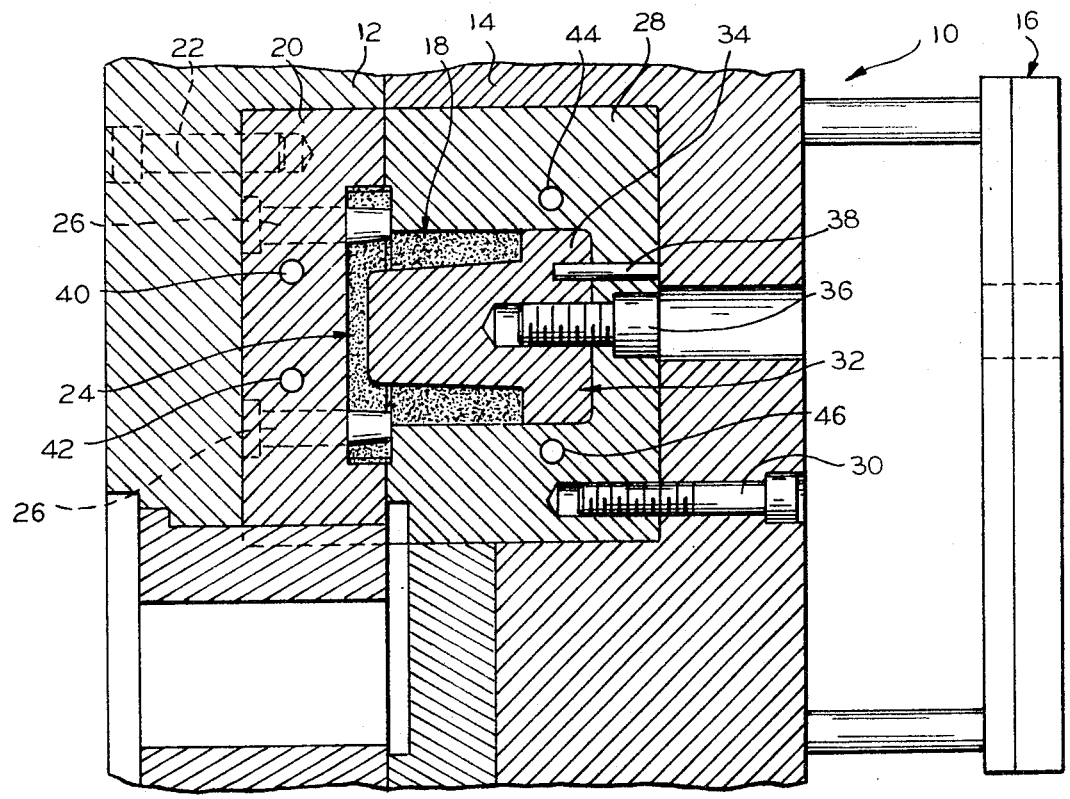
FIG. 2 is a sectional view of the structure shown in FIG. 1 taken substantially along line 2—2 of FIG. 1.

Reference numeral 10 of FIGS. 1 and 2 indicates a more or less conventional die arrangement for injection molding of aluminum or the like to form a part having a desired configuration from aluminum or other material that is being used for molding purposes.

The die plate 10 generally comprises outer mounting plates 12 and 14 suitably supported in any suitable manner, with the die plate 14 being connected to movable frame 16 for separation from die plate 12 to expose the product 18 that is being molded.

The die plate 12, which is fixedly mounted, supports die plate molding member 20, which is suitably connected to the plate 12 by suitable bolts 22 or the like, and is formed with product forming recess 24, and mounts die pins 26 that are employed to define bolt receiving holes or the like in the product 18.

Die plate 14 mounts die plate molding member 28 that is secured in place by suitable bolts 30 and defines product forming recess 32 in which is suitably mounted product forming member 34, held in place by a suitable bolt 36, with dowel pin 38 being provided for alignment purposes.

Die member 20 is formed with coolant receiving passages 40 and 42 that are aligned with correspondingly located passages in plate 12 (not shown) while die plate member 28 is formed with coolant receiving passages 44 and 46 aligned with the respective corresponding lead-in passages 45 and 47, the latter two sets of passages being illustrated in FIG. 1 in dashed lines. As shown in FIG. 1, coolant receiving passages 44 and 46 are connected at their inner ends by coolant receiving passage 48 (coolant receiving passages 40 and 42 of die member 20 being similarly connected though this is not illustrated).

To form the product 18, the die 10 is assembled and molten metal inserted into the cavity defined by die members 20, 28 and 32. As is conventional, coolant fluids are ordinarily circulated through the indicated coolant receiving passages to keep the heat content of the die 10 to reasonable levels that will avoid deterioration of the material from which the various die members are formed.

Figure 3:
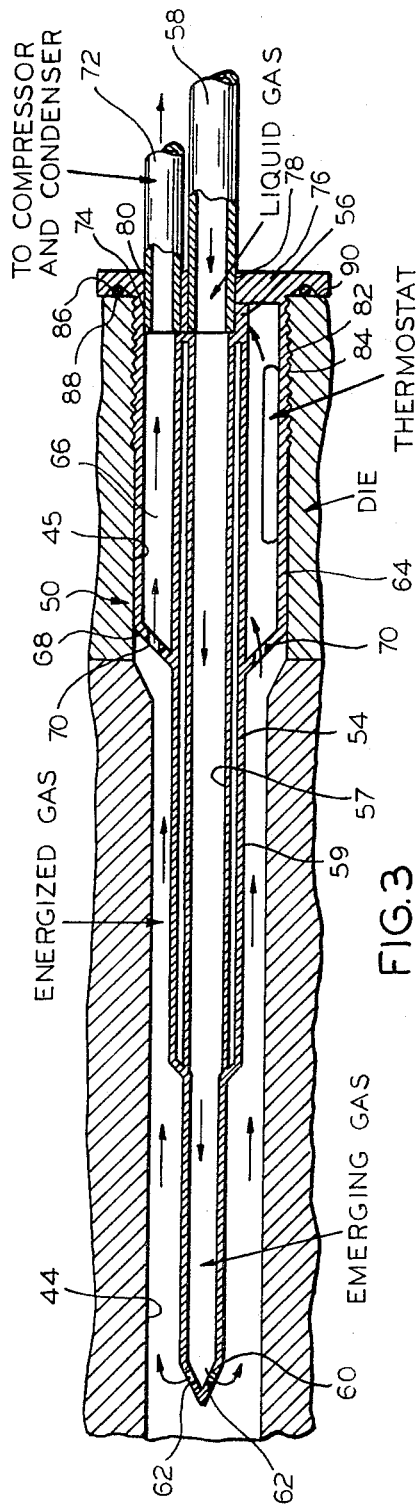
FIG. 3 is a sectional view along one of the coolant passages of the die of FIG. 1, diagrammatically illustrating the coolant supplying probe of this invention.
Figure 4:
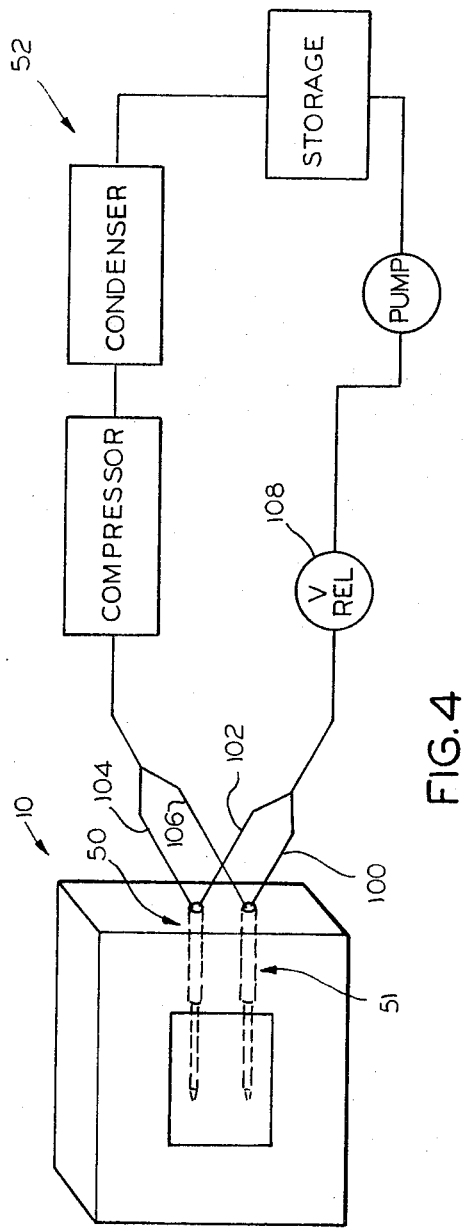
FIG. 4 is a diagrammatic view illustrating the die in block diagram form as associated with a closed circuit refrigeration system for supplying the probes shown diagrammatically in FIG. 1.

In accordance with this invention, there is mounted in the passageways 40, 42, 44, 45, 46 and 47 a heat sink in the form of probe structure 50 that is best shown in FIG. 3, which probe structure is incorporated in a suitable closed circuit refrigeration system for supplying a low heat content liquified gas coolant fluid thereto, such as the system 52 that is suggested in FIG. 4. In the form shown, a single probe structure 50 is applied to aligned passages 44 and 45 (see FIG. 3); similar probe structures 50 are applied to the passages 40, 42 and 46 and the passages then are aligned with in a similar manner.

The probe structure 50 comprises an elongate tubular member 54 having one end 56 thereof open to receive a conduit fitting element 58 through which a suitable low temperature liquid gas is supplied to the bore 57 of the member 54. Tubular member 54 includes hollow wall portion 59 suitably arranged for vacuum heat insulation purposes, and at its other end 60 is formed to define one or more discharge orifices 62 through which the coolant is discharged into the coolant passage.

Probe structure 50 also includes a circumambient wall structure 64 forming about the outer portion of the tubular member 54 an annular chamber 66. Wall 64 is joined to the tubular member 54 in the form shown by conical wall 68 formed with a plurality of ports 70 to receive the expanded and vaporized heat carrying gas, which passes through the chamber 66 into a conduit fitting 72 disposed in port 74 of chamber 66. Chamber 66 is otherwise closed by the flange 76 of tubular member 54, which is ported at 78 and 80 to receive the respective conduit fittings 58 and 72, the latter being fixed in seal tight relation thereto in any suitable manner as by soldering or the like.

It is preferred that the probe structure 50 be mounted within the cooling passage 45 in seal tight relation thereto, and in the form shown the wall 64 is threaded as at 82 for screw threaded relation with internal screw threading 84 formed in the entrance to passage 45. The flange 76 is formed with an annular groove 86 that receives suitable O ring seal 88 which is brought into tight sealing relation with the face 90 of the die plate involved.

Probe structure 50 may be formed from any suitable material that will serve the purpose, such as stainless steel or the like, and conduit fittings 58 and 72 are suitably and preferably releasably connected into the close circuit refrigeration system 52 by appropriate connectors that may be of any suitable type compatible with the specific refrigeration system and cooling medium employed.

In this connection, this invention contemplates that the liquified gas employed will be of the type that is liquid only at high pressure conditions, and carbon dioxide is one substance that is a gas at ordinary atmospheric conditions which is suitable for this purpose. Any other cooling medium of this type which is non-flammable and non-corrosive in nature will also be suitable, and the term "liquified gas" as used in the appended claims is intended to mean all comparable substances of this type.

In the showing of FIG. 4, the probe structure 50 is shown together with an identical probe structure 51 for cooling passages of the type illustrated, and the conduit fittings 58 of the respective probe structures 50 and 51 are connected in parallel with the refrigeration system 52 by suitable conduits 100 and 102, while the conduit fittings 72 of the respective probe structures 50 and 51 are connected in parallel with the system 52 by suitable conduits 104 and 106. System 52 includes the usual refrigeration cycle compressor and condenser (with which may be associated suitable cooling apparatus to remove the heat absorbed by the coolant vapor as well as other heat that may be generated in the system), which components are suitably connected to a storage tank from which the reliquified coolant is drawn by a suitable pump as required for resupply to the probes 50 and 51 through suitable control valve 108. Control valve 108 preferably is electrically controlled in any suitable manner to open intermittently in a timed sequence required to supply a charge of liquid coolant to the respective probe structures 50 and then shut off to permit the charge to vaporize and return to the refrigeration system through conduit fittings 72 prior to the supply of another charge of liquid coolant to the respective probe structures 50 and 51.

In use, assuming the die plate in question is equipped with probe structures 50 and 51 in the manner suggested in FIGS. 1, 3 and 4, and when molding procedures are to commence, the die is heated to the requisite operating temperature in any conventional manner and the refrigeration system 52 placed in operation with the valve 108 operating to intermittently supply charges of coolant to the respective probe structures 50 and 51. As each charge is supplied to a probe structure 50 or 51, it moves through the tubular member 54 in the direction indicated by the arrows, as it approaches the end 60 of the tubular member 54, it tends to start vaporizing because of the exposure of the tubular member 54 to the heated conditions surrounding same. The coolant emerges through orifices 62 as rapidly expanding vapor which permeates throughout the passage 54 as well as the connecting passage 48 to absorb excess heat, and the pressure building up in the passages 44 and 46 causes the vaporized coolant to pass through the orifices 70 and into the respective annular chambers 66 of the respective probe structures and thence into the conduit fittings 72 and back into the refrigeration system for cooling reliquification and return to storage.

As indicated in FIG. 3, a suitable thermostatic device may be mounted in the chamber 66 of the respective probe structures 50 and 51 to provide an indication of temperature conditions therein and serve as a means of automatic control of the coolant system by appropriate electrical connections with the control valve 108, the details of which will be within the skill of one familiar with these arts to devise.

It will be apparent that in situations where heat removal requirements are such that the probes 50 and 51 do not adequately cool the die metal in the area of the connecting passage 48, another probe structure identical to probe structures 50 and 52 may be mounted in the passage 58. In practicing my invention, connecting passage 48 is not needed, and may be suitably closed off.

As indicated in FIG. 3, tubular member 54 adjacent its end 60 may be of reduced transverse cross-sectional dimension to accentuate the rapid flow of the coolant from the orifices 62 into the die cooling passages as well as to accommodate diameter differences in bores defining particular cooling passages.

It will be noted that the respective probe structures 50 and 51 (and in particular the bores 58 of tubular member 54 and the chamber 66) and the die passages in which they are disposed complete the closed conduit refrigeration system 52, coolant loss is minimized, and the operating temperatures of the liquified gas coolant employed are such that the incoming coolant provides a high heat starved capacity for absorbing excess heat from the die, with the absorbed heat then being carried by the vaporized coolant back into the refrigeration system for release and reliquification of the coolant.

The die passages in which the probes 50 and/or 51 are disposed become closed heat sink chambers that are a part of the closed circuit refrigeration system involved. The die openings employed to receive probes 50 and/or 51 may be conventional coolant flow passages of the type illustrated, or special closed chambers of appropriate volume and spacing about the die. Such chambers may be formed at any side of die and can be arranged in a radial manner, similar to spokes in a wheel, about the product forming recesses of a die to create a significantly high rate of heat flow away from the critical die parts. By achieving the heat flow rates contemplated by this invention, die material melting points may be correspondingly lowered with consequent savings in die casts.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. A cooling arrangement for cooling a die formed with a coolant receiving passage having an end opening, said arrangement comprising, in combination:

a probe structure adapted to be positioned within the passage at the end opening thereof, said probe structure comprising:

an elongate tubular member open at one end thereof to receive the coolant fluid and including a discharge orifice at the other end thereof from which the coolant is discharged into the passage, and a wall structure in circumambient relation about said tubular member adjacent said one end thereof and defining with said tubular member an annular chamber about said tubular member, said chamber having a coolant outlet adjacent said one end of said tubular member and a coolant inlet positioned short of and spaced from said discharge orifice, said tubular member open end and said chamber outlet being incorporated in a closed circuit refrigeration system for supplying liquified gas coolant under pressure to said tubular member open end for passage therethrough into the passage, and for receiving expended coolant gas from said chamber outlet for cooling, condensing and return to said tubular member open end, said tubular member at said discharge orifice and between said discharge orifice and coolant inlet of said chamber being free of enclosure for direct application of the coolant, emitting into the die passage from said tubular member orifice, to the die surfaces defining the passage, thermostatic means mounted in said chamber for controlling supply of said coolant to said tubular member, and means for mounting said probe structure in the die passage end opening in sealed relation thereto with said tubular member other end projecting inwardly of the passage end opening, said tubular member between said discharge orifice thereof and said chamber inlet protruding from said chamber to define a coolant expansion space within the passage along said tubular member that is bounded by the adjacent of the die surfaces defining the die coolant passage, said mounting means comprising said wall structure being proportioned and threaded externally thereof adjacent said member one end for threaded application to the die passage end opening, whereby when said probe structure is mounted in the passage, the passage becomes a heat sink chamber that is closed by said probe structure at the passage end opening.

2. The cooling arrangement set forth in claim 1 wherein:
said system includes means for supplying charges of said liquified gas to said probe structure intermittently in a timed sequence permitting each such charge supplied to evaporate.

3. The cooling arrangement set forth in claim 2 wherein:
said gas is carbon dioxide.

* * * * *